3,074,975
NAPHTHACENEQUINONES

Jerry Robert Daniel McCormick, New City, N.Y., and William Elmore Gardner, Ridgewood, N.J., assignors to American Cyanamid Company, New York, N.Y., a corporation of Maine
No Drawing. Filed Nov. 7, 1960, Ser. No. 67,456
3 Claims. (Cl. 260—377)

This invention relates to novel organic compounds, to their production by fermentative processes, and to methods for recovering, concentrating and purifying them. More specifically, this invention pertains to certain naphthacenequinones and their derivatives and salts some of which are elaborated during the controlled fermentation of certain strains of Streptomyces aureofaciens. The novel naphthacenequinones of this invention may be represented by the following formula:

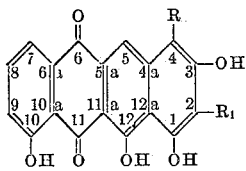

wherein R is a member of the group consisting of dimethylamino, hydroxyl and hydrogen and $R_1$ is a member of the group consisting of carboxamido, cyano and hydrogen and the acid addition salts thereof.

The naphthacenequinones of this invention are highly colored crystalline materials which show considerable promise as pigments in paint, coating compositions and inks. Furthermore, since these compounds are blue in alkaline solutions (pH 9) and red in acid solutions (pH 3), and exhibit a sharp color change at the pH transition point, they appear to be valuable as pH indicators. The new compounds show no solubility in water or most acids, aer only slightly soluble in common organic solvents and acetic acid, are fairly soluble in sulfuric acid, hot chlorophenol, hot phenol, hot pyridine, and hot dimethyl formamide and have excellent solubility in mixtures of nitrogenous bases with lower alkyl ketones or N-dialkyl amides.

The hydrochloride salts of the basic products of this invention are formed in acetic acid using concentrated hydrochloric acid to give a monohydrochloride solvated with one molecule and acetic acid:

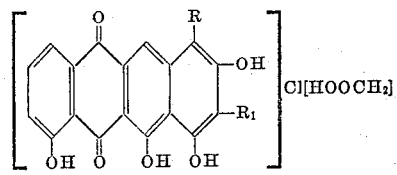

wherein R is dimethylamino and $R_1$ has the meaning hereinbefore given.

The hydrochlorides are hydrolysed in water, that is water will convert the hydrochloride salt back to the free base. Other acid salts such as the hydrobromides, perchlorates, etc. can similarly be formed in glacial acetic acid solution by addition of the proper acid. By using a nitrogenous base such as triethylamine, in conjunction with a neutral solvent, e.g. dimethylformamide, the anionic salts are formed. Alkali metal salts such as monosodium, disodium, etc. can be formed as insoluble products in aqueous media by the use of the proper alkali. The metal salts are insoluble in water. The dimethylamino group can be removed and replaced with other groups such as hydrogen or hydroxyl. For example, the dimethylamino group can be replaced by hydrogen under mild reducing conditions such as those of hydrosulfite in alkali. The carboxamide in position 2 can be converted to the nitrile.

A systematic name for the parent compound of this series is 2-carboxamido-4-dimethylamino-1,3,10,12-tetrahydroxy-6,11-naphthacenequinone.

The parent naphthacenequinone is produced by certain mutant strains of the species Streptomyces aureofaciens. Viable cultures of some of these strains have been deposited with the American Type Culture Collection, Washington, D.C., ATCC accession numbers 12551, 12552, 12553 and 12554.

The growth of the Streptomyces aureofaciens organisms ATCC Nos. 12551, 12552, 12553 or 12554 may take place in a variety of liquid culture media. For example, any assimilable source of carbon, such as the polysaccharides or starches, or polyalcohols such as glycol or glycerol may be used. An assimilable source of nitrogen may be supplied through the use of proteins, protein hydrolysates, or degradates, polypeptides or amino acids. The common anions and cations are supplied in the form of their non-toxic salts. Trace elements such as boron, molybdenum, copper, etc. are obtained either as impurities in the above compounds, or through the use of tap water or by specifically adding solutions especially enriched with these trace elements. Aeration for these aerobic fermentations is supplied in the tanks and bottles by forcing sterile air through or onto the surface of the fermenting medium. Needed agitation is provided for by devices such as mechanical impellers. Anti-foaming agents such as octadecanol and/or lard oil are added as needed.

The fermentation process of the present invention is generally the same as that for the production of chlortetracycline (see United States Patent No. 2,482,055) and tetracycline (see United States Patent No. 2,734,018), the principal difference being the selection of one of the aforementioned mutant strains, or its equivalent, of Streptomyces aureofaciens. The composition of the fermentation medium, the rate of aeration, time, temperature, hydrogen ion control, method of inoculation and the like, as set forth in the above-identified patents are suitable for the production of the parent naphthacenequinone.

After the fermentation is complete, the culture broth containing the novel compound of this invention is acidified to about pH 1.0–1.5, a filter aid is added and the culture broth filtered. The filtrate is discarded and the filter cake reslurried in acid water solution at pH 1–1.5. After slurrying for 30 to 90 minutes the cake is refiltered and the filtrate again discarded. The naphthacenequinone is separated from the spent filter aid cake by placing the cake in an appropriate solvent such as dimethylformamide or methyl isobutyl ketone, containing 10% triethylamine, filtering off the filtrate containing the pigment and concentrating the filtrate to a solid residue and leaching the residue with a petroleum type solvent in order to remove fatty impurities and redissolving the solids in the proper solvent and precipitating the product as crystals which are filtered off, washed and dried.

It should be noted in the dissolving and re-dissolving steps neither the nitrogenous base nor the lower alkyl ketone nor the N-dialkyl amide alone is a good solvent for the naphthacenequinone product, only when the nitrogenous base is paired with either a lower alkyl ketone or an N-dialkyl amide is solution of the colored material possible.

A more detailed illustration of the fermentation, isolation and refining of the novel naphthacenequinones of this invention is presented in the examples which follow.

Example 1

A suitable medium for the preparation of inocula for these fermentations may be prepared with the following substances:

| | |
|---|---|
| Sucrose _____ g./l__ | 30 |
| $(NH_4)_2SO_4$ _____ g./l__ | 2 |
| $CaCO_3$ _____ g./l__ | 7 |
| Corn steep liquor _____ ml./l__ | 16.5 |

The pH of the medium is about 6.8. An 8 milliliter portion is measured into an 8-inch Brewer tube and sterilized at 120° C. for 20 minutes. The sterilized medium is then inoculated with 0.5 milliliters of an aqueous spore suspension of a strain of *Streptomyces aureofaciens* (ATCC No. 12552), containing approximately 40–60 million spores per milliliter. The inoculated medium is incubated for 24 hours at 28° C. on a reciprocating shaker operated at 110 cycles per minute.

A suitable fermentation medium contains water and a source of assimilable carbon and nitrogen and essential mineral salts. A typical medium is as follows:

| | |
|---|---|
| Corn starch _____ g./l__ | 55 |
| $CaCO_3$ _____ g./l__ | 7 |
| $(NH_4)_2SO_4$ _____ g./l__ | 5 |
| $NH_4Cl$ _____ g./l__ | 1.5 |
| $FeSO_4.7H_2O$ _____ mg./l__ | 40 |
| $MnSO_4.4H_2O$ _____ mg./l__ | 50 |
| $ZnSO_4.7H_2O$ _____ mg./l__ | 100 |
| $CoCl_2.6H_2O$ _____ mg./l__ | 5 |
| Corn steep liquor _____ g./l__ | 30 |
| Cottonseed meal _____ g./l__ | 2 |
| Lard oil _____ percent v./v__ | 2.0 |

Example 2

A shaker flask fermentation which results in the production of the naphthacenequinone of this invention is conducted with a medium prepared as follows:

| | |
|---|---|
| Corn steep liquor _____ g./l__ | 30 |
| Lard oil _____ percent v./v__ | 2 |
| Corn starch _____ g./l__ | 55 |
| Cottonseed meal _____ g./l__ | 2 |
| $CaCO_3$ _____ g./l__ | 7 |
| $(NH_4)_2SO_4$ _____ g./l__ | 5 |
| $FeSO_4.7H_2O$ _____ mg./l__ | 40 |
| $ZnSO_4.7H_2O$ _____ mg./l__ | 100 |
| $MnSO_4.4H_2O$ _____ mg./l__ | 50 |
| $NH_4Cl$ _____ g./l__ | 1.5 |
| $CoCl_2.6H_2O$ _____ mg./l__ | 5 |

A 25 milliliter portion is measured into a 250 milliliter Erlenmeyer flask, sterilized for 20 minutes at 120° C. and inoculated with 1 milliliter of mycelial growth prepared as in Example 1. After incubation for 120 hours at 26° C. on a rotary shaker at 186 r.p.m. the mash is harvested.

Example 3

A 40 liter tank fermentation is carried out in a pilot tank essentially according to the method described in Example 2. The medium, after preparation, is sterilized for 25 minutes at 125° C., and inoculated with *Streptomyces aureofaciens* strain ATCC No. 12551 inoculum prepared as set forth in Duggar, United States Patent No. 2,482,055. The fermentation is carried out with continuous agitation, at a temperature of 28° C. for the first 24 hours and 25° C. until completion at 135 hours. Sterile air is introduced at a rate of 0.3 l./l./min. for the first sixteen hours, followed by 0.5 l./l./min. to harvest.

Example 4

The cake which is the source of the naphthacenequinone derivative is prepared as follows:

A 25.8 liter portion of the fermentation harvest mash of Example 3 is treated with about 200 milliliters of concentrated hydrochloric acid to adjust the pH to 1.5. The acidified mash is filtered after mixing with 2.8 kilograms of diatomaceous earth to obtain 16.3 liters of filtrate. The filter cake is reslurried with 25 liters of water at a temperature of about 50° C. and adjusted to pH 1.5 with concentrated hydrochloric acid. After stirring for 30 minutes the reslurried cake is filtered, washed and the cake retained for further processing.

Example 5

A crystalline sample of the naphthacenequinone derivative is prepared by taking a 16.4 gram portion of the dried cake from Example 4, grinding fine and refluxing with stirring for one hour with 100 milliliters of methyl isobutyl ketone and 10 milliliters of triethylamine. A 74 milliliter volume of hot filtrate is obtained.

Ultraviolet assay as 565 m$\mu$ shows the presence of 0.5 gram of the naphthacenequinone derivative. This solution is mixed with 10 volumes of boiling acetic acid and cooled, resulting in the precipitation of a spectroscopically clean crystalline product solvated with one mole of acetic acid. Microanalysis of the resulting crystals: C, 58.17; H, 4.18; N, 5.85. Calculated for $C_{21}H_{16}O_7N_2.CH_3CO_2H.\frac{1}{2}H_2O$: C, 57.4; H, 4.31; N, 5.9.

When the compound is recrystallized out of refluxing xylene, it loses water and acetic acid of solvation, yielding an essentially pure material. Microanalysis: C, 61.7; H, 4.4; N, 6.38. Calculated for $C_{21}H_{16}O_7N_2$: C, 61.8; H, 3.9; N, 6.85.

Example 6

Thirty (30) kilos of dried cake, prepared by the procedure of Example 4, is refluxed with 50 liters of a mixture of 10% triethylamine in methyl isobutyl ketone for 3 hours at 80–90° C. The slurry is filtered while warm and this primary filtrate saved. The filter cake is reslurried in 20 liters of a mixture of 10% triethylamine in methyl isobutyl ketone at 60° C., filtered, and this secondary filtrate saved. The filter cake is discarded. The primary and secondary filtrates, ink blue in color, are pooled and then concentrated at 100° C. under vacuum until a heavy slurry remains. The concentrate is transferred to a 20 liter flask to which is added a mixture of 14.5 liters of toluene plus 0.450 liter of acetic acid. The mixture is agitated for 15 minutes, then filtered. The filter cake is washed three times with 50-milliliter quantities of toluene, and once with 150 milliliters of petroleum ether. The washed crystals are dried in a vacuum drier for 12 hours. This procedure is repeated with the other two 30-kilogram quantities of dried cake. Dry weights of crude crystals obtained from the 3 runs are 99 grams, 89 grams, and 85 grams respectively. The three batches of crude crystals are combined (273 grams total), placed in a sintered glass funnel, slurried with 700 milliliters of a 5% mixture of triethylamine in dimethylformamide, mixed for 5 minutes and then filtered. The process of slurrying, mixing, and filtering is repeated twice more with fresh 700-milliliter volumes of 5% triethylamine in dimethylformamide. The filtrates are combined, treated with 680 milliliters of glacial acetic acid and stirred for 24 hours. The crystals which precipitate out as a result of this treatment are collected by filtration, washed with methanol, and vacuum-dried at 40° C. The product yield is 61.3 grams of the desired naphthacenequinone. The substance is reddish-brown in color.

Example 7

The 4-hydroxy analog may be prepared from the parent naphthacenequinone derivative as follows:

A 1.74 gram sample of parent compound is dissolved in 300 milliliters of dimethylformamide by warming. The filtered solution is warmed to 50° C. and 10 milliliters of concentrated hydrochloric acid is slowly added. Sodium nitrite is slowly added until the fumes over the mixture indicate an excess of nitrous acid. The mixture is stirred for an additional 10 minutes and cooled to room temperature which results in the precipitation of a crystalline product. The mixture is stirred for 30 minutes and 200 milliliters of water slowly added and the product recovered by filtering. The product is washed with water, 1:1 water-methanol, and finally with diethyl ether. The air dried brown product weighs 1.344 grams. The product is easily recrystallized by dissolving in hot dimethylformamide, cooling and adding an equal volume of water. The identity of the hydroxy compound is confirmed by the analysis and the infrared maximum at 5.95μ.

Analysis: Calculated for $C_{19}H_{11}O_8N$: C, 59.9; H, 2.9; N, 3.68. Found: C, 60.09; H, 2.98; N, 3.4.

*Example 8*

The corresponding 4-hydrogen substituted naphthacenequinone is prepared by taking a .336 gram sample of the parent compound in a flask provided with a stirrer and a nitrogen atmosphere and adding 5 milliliters of water and 400 milligrams of NaOH and an air-free solution of sodium hydrosulfite ($Na_2S_2O_4$) 850 milligrams in 10 milliliters of water. The solution is stirred for 2 hours and aerated to form the dark blue dedimethylaminonaphthacenequinone. Excess HCl is added to precipitate the maroon solid.

Analysis: Calculated for $C_{19}H_{11}O_7N \cdot H_2O$: C, 59.6; H, 3.55; N, 3.66. Found: C, 59.15; H, 3.39; N, 3.71.

*Example 9*

A 2-cyanonaphthacenequinone derivative is prepared by dissolving the parent compound in 10 volumes of pyridine by warming, then cooling the solution and adding 4 moles of methane sulfonyl chloride and holding the mixture at room temperature for 5 days. The excess pyridine is then removed by vacuum distillation and the residue taken up in 6 N HCl resulting in the precipitation of the nitrile. The nitrile is then washed with 1:1 acetic acid, water and then with ethanol. The identity of the product is confirmed by the infrared spectrum which shows a maximum at 4.52μ.

*Example 10*

A 0.5 gram quantity of the naphthacenequinone derivative obtained from Example 6 and 0.8 gram of vehicle (100 parts by weight of No. 1 transparent litho varnish and 4 parts by weight of cobalt paste dryer containing 2.5% cobalt) are dispersed on the Hoover muller, mulling 2×100 revolutions using 150 pounds pressure on the plates. There results a paste, which, when applied to a substrate as by printing on paper, imparts a very deep maroon colored finished coating.

A tinted coating composition such as a tint paste may be made using the colored paste prepared above by blending one part of the base color paste as prepared above with 100 parts of tinting white (70 parts of zinc oxide, 29 parts of No. 2 transparent litho varnish and one part of No. 6 paste dryer).

*Example 11*

A mixture of 1.0 gram of the naphthacenequinone derivative, 1.6 gram of Rezyl 387.5 (short oil-soya modified glycerol phthalate alkyd resin solution-60% resin in xylol) and 1.50 gram of xylol is prepared, and the components of the mixture are dispersed by running 1×100 revolutions on a Hoover muller using 150 pounds pressure on the muller plates. The resulting paste is then transferred immediately to a 2-ounce screw cap bottle and the following materials are added slowly with mixing to assure uniform dispersion of the muller paste.

|  | Grams |
|---|---|
| Rezyl 387.5 | 4.36 |
| 60% melamine formaldehyde resin-40% butanol | 0.98 |
| Butanol | 1.12 |

For application of this to metal as an enamel coating composition, it is applied in a thin film to the metal and after allowing time for evaporation of all solvents from the film, it is cured by heating for 45 minutes at 270° F. The enamel finish thus imparted is a very deep dark maroon color. The shade of the color may be lightened by the addition of light tinting material.

We claim:
1. A compound selected from the group consisting of those represented by the formula:

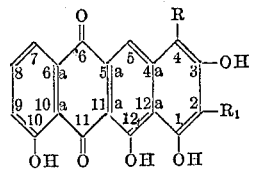

wherein R is a member of the group consisting of dimethylamino, hydroxyl and hydrogen and $R_1$ is a member of the group consisting of carboxamido, cyano and hydrogen and the acid addition salts thereof.

2. 2 - carboxamido - 4 - dimethylamino - 1,3,10,12-tetrahydroxy-6,11-naphthacenequinone.

3. A process for producing 2-carboxamido-4-dimethylamino - 1,3,10,12 - tetrahydroxy - 6,11 - naphthacenequinone of the formula:

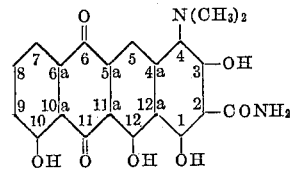

which comprises cultivating a microorganism selected from the group consisting of *Streptomyces aureofaciens* ATCC 12551, 12552, 12553 and 12554 in an aqueous nutrient medium containing assimilable sources of carbohydrate, nitrogen and inorganic salts until substantial quantities of 2-carboxamido-4-dimethylamino-1,3,10,12-tetrahydroxy-6,11-naphthacenequinone are obtained.

References Cited in the file of this patent
UNITED STATES PATENTS

| 2,734,018 | Minieri et al. | Feb. 7, 1956 |
| 2,739,924 | Manlius et al. | Mar. 27, 1956 |